(12) United States Patent
Axelrod et al.

(10) Patent No.: US 9,788,529 B2
(45) Date of Patent: Oct. 17, 2017

(54) ANIMAL CHEW HAVING EXPOSED REGIONS OF DIFFERENT HARDNESS

(71) Applicant: T.F.H. PUBLICATIONS, INC., Neptune City, NJ (US)

(72) Inventors: Glen S. Axelrod, Colts Neck, NJ (US); Ajay Gajria, Maharashtra (IN)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 0 days.

(21) Appl. No.: 15/181,562

(22) Filed: Jun. 14, 2016

(65) Prior Publication Data

US 2017/0020110 A1    Jan. 26, 2017

Related U.S. Application Data

(62) Division of application No. 12/398,907, filed on Mar. 5, 2009, now Pat. No. 9,363,981.

(51) Int. Cl.
| | | |
|---|---|---|
| *A01K 15/02* | (2006.01) | |
| *A23K 20/163* | (2016.01) | |
| *A23K 40/20* | (2016.01) | |
| *A23K 50/42* | (2016.01) | |
| *A23K 10/20* | (2016.01) | |

(52) U.S. Cl.
CPC .......... *A01K 15/026* (2013.01); *A01K 15/025* (2013.01); *A23K 10/20* (2016.05); *A23K 20/163* (2016.05); *A23K 40/20* (2016.05); *A23K 50/42* (2016.05)

(58) Field of Classification Search
CPC ............................ A01K 15/026; A01K 15/025

USPC ................ 119/709, 710, 707, 711; 426/516; 264/273, 274, 255; 425/112
See application file for complete search history.

(56) References Cited

U.S. PATENT DOCUMENTS

| | | | | |
|---|---|---|---|---|
| 4,835,000 A | * | 5/1989 | Kehoe | A23G 3/2015 426/249 |
| 5,827,565 A | * | 10/1998 | Axelrod | A01K 15/026 426/104 |
| 6,067,941 A | * | 5/2000 | Axelrod | A01K 15/026 119/707 |
| 2004/0244719 A1 | * | 12/2004 | Jager | A01K 15/026 119/709 |
| 2005/0166865 A1 | * | 8/2005 | Handelsman | A01K 15/026 119/709 |
| 2006/0048718 A1 | * | 3/2006 | Mann | A01K 15/026 119/710 |
| 2007/0044730 A1 | * | 3/2007 | Axelrod | A01K 15/026 119/709 |
| 2007/0289552 A1 | * | 12/2007 | Axelrod | A01K 15/026 119/710 |

(Continued)

*Primary Examiner* — Son T Nguyen
(74) *Attorney, Agent, or Firm* — Grossman, Tucker, Perreault & Pfleger, PLLC

(57) ABSTRACT

The present invention relates to an animal chew toy comprising a first material including a body portion and one or more exposed regions comprising a second material, the material of the exposed regions at least partially occupying one or more blind holes in the body portion wherein the one or more blind holes may include an undercut or die locked condition to aid in retaining the second material. The chew may be formed via a number of molding methods including those utilizing injection molding or extrusion techniques. The first and second materials may comprise edible compositions.

11 Claims, 3 Drawing Sheets

(56) References Cited

U.S. PATENT DOCUMENTS

2008/0029045 A1* 2/2008 Willinger ............. A01K 15/026
  119/710
2010/0083910 A1* 4/2010 Axelrod ................ B29C 66/712
  119/709

* cited by examiner

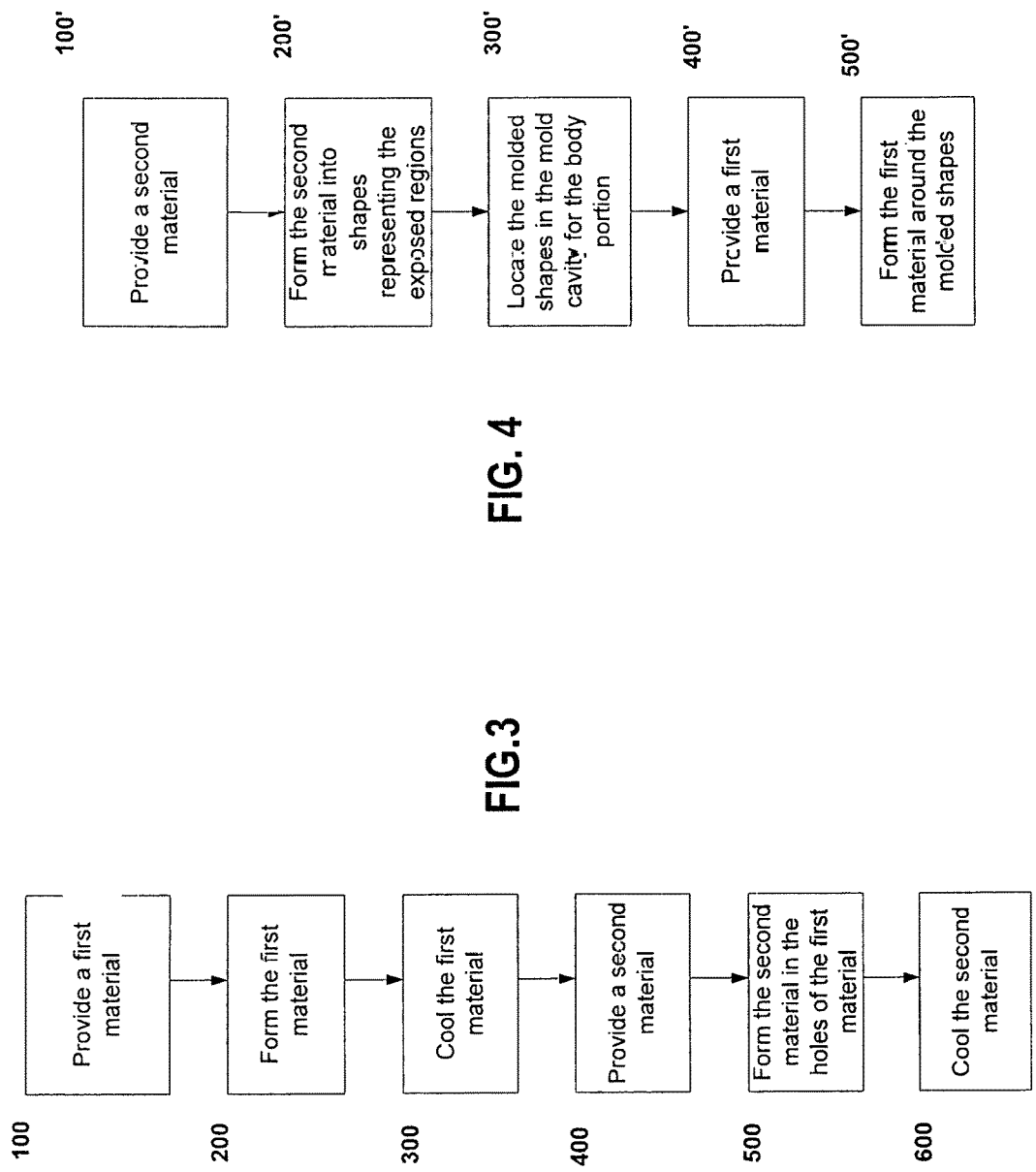

ANIMAL CHEW HAVING EXPOSED REGIONS OF DIFFERENT HARDNESS

FIELD

The present invention relates to an animal chew having a body portion and ends of a first material, wherein the body portion has exposed regions of a second material which has different properties than the first material. In particular, the present invention relates to a body portion having a first hardness and exposed regions in the body portion having a second hardness.

BACKGROUND

Most dogs enjoy chewing on things, although preferences vary as to the hardness of the substances favored. Some dogs like to chew on very hard materials such as cow bones, wood and nylon, while others prefer softer chews such as polyurethane or rubber. Still others favor freeze dried snacks. Some dogs due to their age may not be able to chew on very hard substances. Young dogs may have insufficiently developed teeth, while old dogs may have diseased gums or may have lost some of their teeth.

Furthermore, chew toys may be used as a vehicle to provide interaction between dogs and people. For example, some people like to play fetch with dogs using sticks, balls, flying disks, etc. Other people like to play "tug-of-war" with their animals, using ropes, sticks, etc. The interaction between animals and their owners has reportedly been found to be not only beneficial to the animal, as it provides the animal with necessary exercise and companionship, but beneficial to their owners as well, with many reported health related benefits.

Accordingly, the prior art is replete with disclosures directed at forming a variety of chew toys. However, there is still a need to provide chew toys that fulfill other requirements. For example, it may also be useful to provide animal chews that are interesting not only to animals, but to the animal owners as well. Additionally, it may also be useful to provide animal chews that enhance the feel of the chew to the animal or owner. Accordingly, an animal toy of novel construction may be directed to sparking the interest of, not only the animal, but children, teenage or adult owners, which may increase the time period that owners engage with their animals.

More particularly, it may be preferred that chew toys have a reasonable durability and maintain the interest of the animal for more than one interaction. Further, it may be preferred that such chew toys comprise more than one material such that a variety of chewing experiences may be provided for the animal. Towards that end, if different materials having different physical properties, such as hardness or different attractant properties, can be combined into a single chew, the animal may prefer one of the materials over the other and remain interested for a longer time period while attempting to dislodge such. Accordingly, it may be desirable that means be provided to retain such preferred materials from easily being dislodged or removed from the body of the chew. In addition, the body and ends of the chew may include a series of ridges or protrusions that may interact with the teeth of the animal to provide a massaging and/or cleaning action.

SUMMARY

An aspect of the present invention relates to an animal chew comprising a first material including a body portion and ends and having a plurality of protrusions extending therefrom and one or more exposed regions comprising a second material, the second material optionally having a plurality of protrusions extending therefrom, the exposed regions at least partially occupying one or more blind holes in the body.

Another aspect of the present invention relates to an animal chew comprising a first material including a body and ends and having a plurality of protrusions extending therefrom and one or more exposed regions comprising a second material, the exposed regions at least partially occupying one or more blind holes in the body, wherein the one or more blind holes includes an undercut or dielocked condition to aid in retaining the second material.

Another aspect of the present invention relates to the first material having one or more properties that are different from the second material, for instance; hardness, taste, color, odor, toughness, elasticity, composition, texture, and moisture content.

A further aspect of the present invention relates to a method for forming an animal chew. A first material may be formed into a first configuration including a body portion and, optionally, ends and having a plurality of protrusions that may extend from the body portion or ends. The end portions may include bulbous shapes, such as a condyle. A second material may be formed into a configuration over all or a portion of the body portion and within blind holes formed in the first material. In addition, one or more blind holes may include an undercut or dielocked condition to aid in retaining the second material to the first.

A further aspect of the present invention relates to a method of forming an animal chew. A second material may be formed into a configuration, wherein the configuration comprises one or more moldings having a protrusion or a hollow portion including protrusions that extend from the inner surface of the hollow molding. A first material may then be formed around the protrusions or within the hollow portion of the second material configuration such that the protrusions are surrounded and a portion of the protrusion is left exposed. The protrusions may comprise one or more cylindrical or cone-shaped configurations wherein the cone-shape is of smaller cross-sectional dimension at some point along the length of the protrusion in comparison to the cross-sectional dimension at the end of the protrusion. In this fashion, the equivalent of one or more blind holes in the body of the first material may be provided to provide an undercut or die-locked condition to aid in retaining the second material to the first.

BRIEF DESCRIPTION OF THE DRAWINGS

The detailed description below may be better understood with reference to the accompanying figures which are provided for illustrative purposes and are not to be considered as limiting any aspect of the invention.

FIG. 3 is flow diagram of an exemplary method which may be used to form a device contemplated by the present invention.

FIG. 4 is flow diagram of another exemplary method which may be used to form a device contemplated by the present invention.

DETAILED DESCRIPTION

The present invention relates to an animal chew that provides a first material and a second material, the second material located in blind holes formed in the first material, forming exposed regions of the second material. The blind holes may include an undercut or die-locked condition to aid in retaining the second material within the blind holes.

In particular, the first material may form a body portion and an end portion and may include a plurality of protrusions extending from the body portion and/or end portion. In addition, the end portions may comprise bulbous shapes, such as one or more condyles.

The present invention also relates to providing a first material that may have a first hardness and the second material that may have a second hardness, different from the first hardness. The animal chew may be formed by a number of over-molding processes such as insert molding, multiple component molding or extrusion techniques. It is further contemplated that the two materials may be separately molded to shape and snap-fit together using tapered blind holes to provide an animal chew. Further, the two materials representing a body portion and exposed regions may be snap-fit together such that the exposed region portion connects two body portions in chain-like fashion. Still further, combinations of over-molding and snap-fitting may be used where the ends of the exposed regions which have been molded onto a body portion extend beyond the body portion and include protrusions which may be snap-fit into tapered holes formed in an extended end of another body portion having tapered holes.

Figure 1:
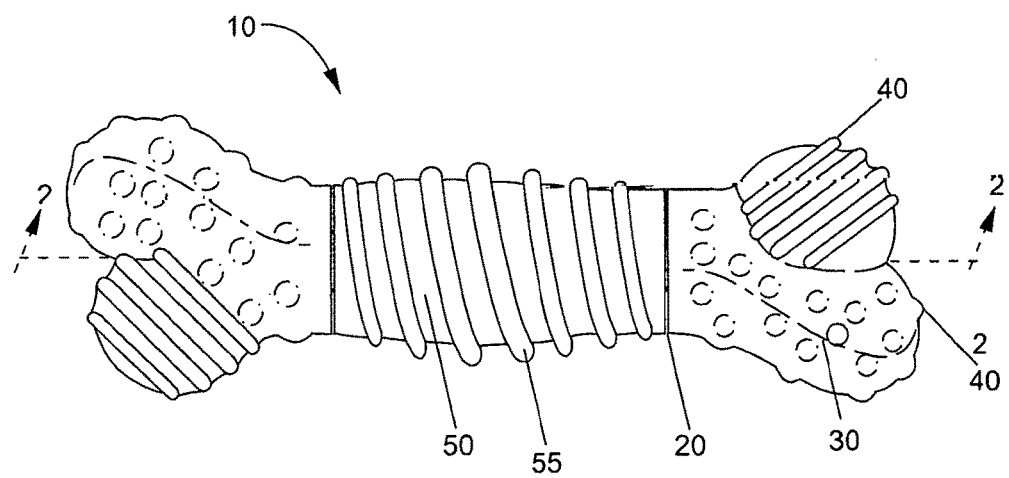
FIG. 1 is a perspective view of an exemplary embodiment of the present invention.

In an exemplary embodiment, as illustrated in FIG. 1, an animal chew 10 may assume the shape of dog bone having a body portion 20 and, optionally, end portions 30. The body portion 20 and end portions 30 may optionally include a plurality of protrusions 40 which may interact with the teeth of an animal that may interface with the animal chew. It is contemplated that the animal chew may not be limited to the shape of a dog bone, but may have any shape that may be conducive to interaction with an animal to provide a chewing experience. For instance, the chew may be in the configuration of, but not limited to, a fish, spare ribs, a t-bone or porterhouse steak, a hair brush or a layered dogbone.

The protrusions 40 may be of similar or varying geometry. The protrusions may have a diameter or thickness equal to or smaller than the diameter or thickness of the body portion. The protrusions may be in the form of ribs or pins and have a profile which is, for instance, round, square, triangular, rectangular, hexagonal, etc. The protrusions may be may not be limited in the manner in which they are disposed, for instance, radially, axially or circumferentially As further shown in FIG. 1, one or more exposed regions 50 in the animal chew 10 may comprise a second material having properties different from the properties of the first material of the body portion 20. These exposed regions may be formed by molding the second material to form exposed regions 50 which at least partially overlie the body portion 20. The body portion may be provided with one or more blind holes which will be filled by the second material effectively locking the second material onto the first material (body portion 20). Such blind holes are defined as holes that do not project fully through the body 20. Further, the blind holes may be undercut or die-locked (see FIG. 2) to further improve retention of the exposed regions to the body portion.

Figure 2:
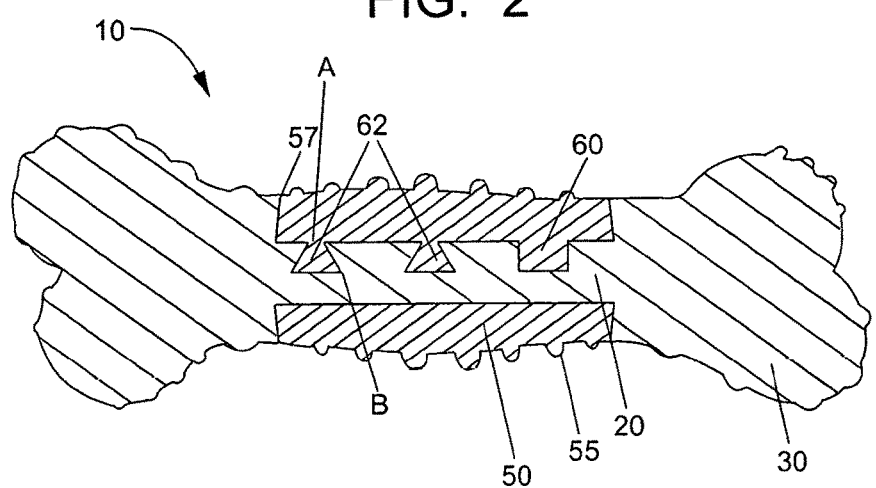
FIG. 2 is a cross-sectional view of the exemplary embodiment of FIG. 1 taken along lines 2-2.

FIG. 2 illustrates, in a sectional view of FIG. 1, the blind holes 60 that are formed only part way through the body portion 20. As shown at 62, some or all of these blind holes may include an undercut or die-locked condition whereby the cross-sectional dimensions of the hole are less at some point above the bottom of the hole (A) than at the bottom of the hole (B). By this condition, when a second material is molded into the blind hole in a first material, the second material may be mechanically locked therein and difficult to remove. In addition, the body portion 20 may include undercut or die-locked sections 57 where the first and second materials interface to further aid in retaining the exposed regions to the body portion.

It should also be appreciated that by selectively placing the blind holes, as shown, on the body portion, one may selectively surround and effectively connect the material of the exposed region 50 which material as noted is different from the material of the body portion 20. In addition, given the application with respect to chewing by the animal, it can be appreciated that the use of blind holes may ensure that the second material is not removed from the body portion of the chew. In those situations where the material of exposed region 50 is relatively softer than the body portion, this may then provide for a relatively more durable chew product.

Along those lines, for a given body having a certain number of holes, one may vary the percent of blind holes having tapering (and die-lock) as opposed to the number of holes that do not have the ability to provide die-lock. In this manner, one may be able to selectively provide a region where the surrounding material of the exposed region released from the body portion, relatively to other portion of the exposed region. This may then provide the ability to control the relative amount of chewing force that may be necessary to consume the surrounding material portion of the animal chew. That is, one may provide one animal chew with relatively easy removal of the center exposed region, one animal chew where it requires a medium level of chewing action to remove the center exposed region, and one animal chew which required a high level of chewing action to remove the center exposed region.

A "blind hole" may be understood as a recess in the surface of the body portion 20, wherein the recess does not extend all of the way through the thickness of the body portion and the recess may be filled with the second material. The additional surface area of the blind hole and the shape of the recess may provide increased adhesion between the first material and the second material. The word "hole" may be understood to include any shape of recess, including but not limited to, a round, oval or square shaped hole, or even a groove and may not be limited in the manner in which it is disposed, for instance, radially, axially or circumferentially. In other words, the blind "holes" may interconnect to form a groove in the surface of the body portion.

The relatively amount of blind holes may be quantified as a percentage of the surface where the exposed region 50 overlies the body portion 20. For example, one may provide an animal chew where the blind holes define 10% to 90% of the surface of the body portion, and includes all values therein, in 1.0% increments. For example, the surface within the blind holes may account for 50% of the surface of the body portion that is engaged to the inside surface of the second material utilized to form the exposed region 50. Preferably, the blind holes may occupy about 20% of the surface area of the body portion that may be covered by the exposed region (second material). In addition, the blind holes may have a depth that is between about 0.100-0.250 inches, preferably about 0.125 inches.

It should therefore be appreciated that body portion 20, end portions 30 of the first material and the exposed regions 50 of the second material may be individually or differently flavored, and/or be comprised of materials having different properties from each other, such as hardness or flavor or composition, etc.

As noted above, the body portion 20 and end portions 30 may be formed of a first material and the exposed regions 50 may be formed of a second material, respectively. The materials may include thermoplastic or thermoset materials, including rubber materials and thermoplastic elastomers. For example, the materials may include polyurethane, nylon, nylon copolymers, styrene-butadiene copolymers, polyether-amide copolymers, silicone, polycarbonate, polycarbonate copolymers, natural rubber, etc. It should be appreciated that the first and second materials may be of the same family, wherein, specific properties of the material, such as the hardness, color or light transmitting capacity of the material may be altered to differentiate the first from the second material.

In addition, the first and/or second material may also include an edible resin composition. Edible resin compositions may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 100-2000 μm including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values therebetween such as 40%, 20%, 10%, etc.

The edible resin compositions herein may be sourced from Manildra Group USA, under the following tradenames: "GEMSTAR 100" which is a refined food grade wheat starch; "GEMSTAR 100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR 100" which is a wheat starch extracted from organic what flour; and/or "ORGANIC GEMGEL 100" which is a pregelatinized organic wheat starch In addition, the resin composition may be sourced from ADM under the tradename "EDIGEL 100" which is a wheat resin composition; "AYTEX P" which is a unmodified food grade wheat starch.

Other edible resin materials may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, thermoplastic materials, and/or thermoset materials.

For example, glutens may be incorporated into the edible resin composition. Gluten may be understood as water-insoluble protein complex extracted from cereal grains such as maize or corn and wheat. The gluten may be present individually or cumulatively between about 0.1-50% by weight of the resin composition and all increments and values therebetween including 0.1-5.0%, 15%, 25%, etc.

In addition various additives may be incorporated into the edible resin compositions. For example, the edible resin compositions may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the edible resin compositions. The emulsifier may be present between about 1-10% by weight of the resin composition and all increments or values therebetween including 3%, 4%, etc. The emulsifier may include, for example, lecithin, which may be extracted or derived from, for example, egg yolk or soy beans.

The edible resin compositions may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the edible resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The edible resin composition may also include water. The water may be introduced into the composition between about 1-40% by weight of the edible resin compositions and any increment or value therebetween, including 4%, 20-40%, 10-20%, etc. After the product has been formed, the water may be present between 1-20% by weight of the resin composition including all increments or values therebetween, such as, below 20%, 4%, 5-10%, etc.

The first and/or second materials (i.e. the edible resin compositions, thermoplastic and/or thermoset resins) may generally include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the resin composition, including all increments and values therebetween, including 10%, 20%, etc.

The first and/or second materials may also include enzymes and/or co-enzymes which are similarly available through Bio Foods, Ltd., Pine Brook, N.J. and sold under the trademark of BT-CoQ10™. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

In addition, herbal extracts, vitamins, minerals, colorants, yeast products, soy products, attractants, etc., may also be incorporated into the first and second material. Yeast products, for example, may include nutritional yeast or brewers yeast such as *saccharomyces cerevisiae*, dairy yeast such as *kluyveromyce marxianus* or wine yeast such as *saccharomyces fermentati*. It should be appreciated that, the first material may be provided with a first colorant, attractant, yeast product, etc. and that the second material may be provided with a second colorant, attractant, etc.

Figure 5:
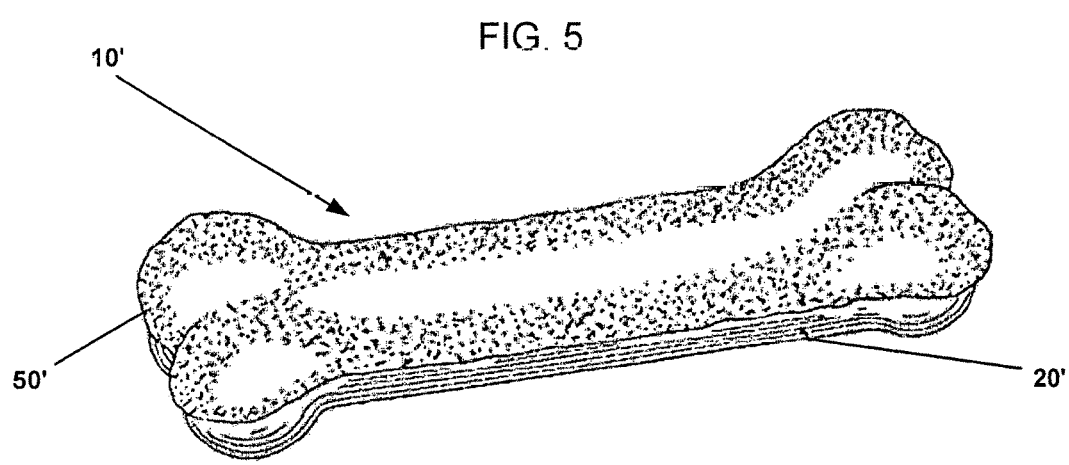
FIG. 5 is a perspective view of a layered animal chew according to the present invention.

In one exemplary embodiment as shown in FIG. 5, the first material forming the body portion 20' of a animal chew 10' may comprise a starch composition which may be injection molded to form an elongated shape having one or more blind holes on an outer surface. The second material may comprise a rawhide composition comprising pellets or strips of beef, gelatin and glycerine. Typical formulations are shown in Table 1 below.

TABLE 1

| First Material | | Second Material |
|---|---|---|
| 0.0 | Beef | 30 ± 10 |
| 80 ± 15 | Potato Starch | 10 ± 3 |
| 16 ± 5 | Glycerine | 20 ± 6 |
| 0.0 | Soy Protein Isolate | 30 ± 10 |
| 2 ± 1 | Chicken Flavor | 2 ± 1 |
| 2 ± 1 | Other Flavorants, etc. | 2 ± 1 |

The ingredients for the second material may be compounded in an extruder and fed to an injection molding machine which may mold the second material into exposed regions 50' overlying the body portion 20' formed of the first material. In addition, the second material may be forced into the blind holes (not shown) in the outer surface of the body portion 20' to assist in adhesion of the overlying exposed layer 50'. The formulations above may be admixed with water in a desired amount (e.g. up to 50% by weight) to facilitate molding. Molding of the materials may be carried out according to the teachings of U.S. application Ser. No. 11/747,132 which is commonly assigned to the assignee of the present disclosure and included herein in its entirely by reference.

In another exemplary embodiment, the first material may have a first hardness, flexural modulus or tensile strength which is different from the corresponding values for the second material which is located in the exposed regions 50, filling in blind holes in the body portion 20. For example, the body portion may have a Shore A durometer of greater than 70, including all values and increments therein up to 100, e.g. 80, 90, etc. The second material forming the exposed regions occupying the blind holes may have a Shore A durometer of less than 70, including all values and increments therein to about 20, e.g. 50, 70, etc. In addition, the flexural modulus of the body portion may have a value of greater than 100,000 psi, and the flexural modulus of the exposed regions occupying the blind holes may have a flexural modulus of about or less than 100,000 psi. The tensile strength of the first material may be about or greater than 10,000 psi, and the tensile strength of the second material may be less than about 10,000 psi.

Along such lines, it may be appreciated that the body portion may therefore provide suitable rigidity such that the animal chew would not sag or be unacceptable for an animal chew toy application. In addition, the selection of materials for the body and exposed regions may be controlled such that there is sufficient bonding at the interface of the two materials, and the materials do not provide a phase separation boundary at such location. Accordingly, the material of the body may be selected to be compatible with the material of the exposed regions, meaning that the materials will not generally phase separate along their boundary line.

In order to optimize the bonding of the body with the exposed regions, the materials may also be selected so that during molding, the surface of the body (first material) may melt a sufficient amount in the presence of the exposed (second) material so that the materials tend to melt bond. To achieve such a result, the melting or softening temperature of the surface of the body material may be controlled to be within about +/−10° C. of the melting or flow temperature of the second material.

With respect to the compatibility requirement, the body material may therefore be selected so that it may have a solubility parameter $\delta_1$ that is within +/−5 units $(cal/cm^3)^{1/2}$ of the solubility parameter value of the exposed (second) material $\delta_2$, including all values and increments therein, such as with in +/−1-2 units, +/−0.25-1 units, etc. Within such limits it is contemplated that the compatibility and phase separation may be controlled to acceptable levels.

Surface treatment of the body material is another option which may similarly provide for suitable bonding of the exposed (second) material. For example, the body material may be first prepared and the surface may be treated with a suitable adhesive resin (e.g., a pressure sensitive adhesive or a hot melt adhesive such as poly(ethylene-co-vinylacetate). In an exemplary embodiment, the adhesive may be coated onto the body material, by methods such as spray coating, dip coating, powder coating, etc. In another embodiment, the adhesive may be injection molded onto the body material. In addition, the surface of the body material may be exposed to plasma treatment or corona discharge to improve bonding. It may also be possible to provide the exposed (second) material with an adhesive component or functionality which may promote adhesion between the second material in the blind holes and the body material. It should also be appreciated that the second material may likewise be treated with an adhesive and/or the body may be provided with an adhesive component or functionality.

Suitable bonding may also be provided by utilizing mechanical interference between the body material and the inserted (second) material. For example, the body and inserted (second) material may be chosen such that the second material has less shrinkage than the body material, thus creating a shrinkage fit due to differential shrinkage. In that regard, the second material may have a volumetric shrinkage that is in the range of about 1% to 10% less than the shrinkage of the body material, including all values and increments therein. It should be appreciated that the volumetric shrinkage may be isotropic or anisotropic.

As alluded to above, the body material and/or the exposed (second) material (thermoplastic, thermoset or edible material) may be luminescent and may include a luminescent additive. Luminescence may be understood as light generated by, for example, chemical or biological change, subatomic motion, crystalline reaction, or stimulation of an atomic system. The luminescent chews may be, for example, fluorescent or phosphorescent.

Fluorescence may be understood as a process in which a high-energy photon may be absorbed and re-emitted as a lower-energy photon having a different or longer wavelength. The re-emission of the photons may occur on the order of a few seconds to a few minutes, including all ranges and increments therein, e.g. 0.01 seconds to 10 minutes. Exemplary fluorescent colorants may be based on aromatic structures such as xanthenes, rhodamines, aminonaphthalimides, perinones, and thioindigos based colorants.

Phosphorescence may be understood as a process in which energy stored in a substance is released very slowly and continuously in the form of glowing light. The release of energy stored in phosphorescent materials may be over a relatively long period of time, from a few seconds to a few hours, including up to 24 hours. Exemplary phosphorescent materials may include zinc sulfide crystals with copper and/or manganese activator; calcium and strontium sulfide activated with bismuth; crystalline structures of metal oxide aluminates, containing one or more of strontium, calcium, magnesium, barium and activated by europium and at least one or more co-activators including ytterbium, dysprosium, neodymium, samarium, thorium, thulium, erbium, etc.

The luminescent additive may be added to the core material in the range of about 0.1% to 50% by weight, including all values and increments therein. The average particle size may be between 0.1-100 microns including all increments and values therein. The luminescent additive may also be spherical or acicular in shape.

The body material and/or the exposed (second) material may be made of a relatively clear polymeric material. For example, the second material may include a material that is capable of transmitting about or greater than 50% of visible light, including all values therein. The second material may also be capable of transmitting greater than 50% of UV radiation, including all values therein. Transmittance may be understood as the ratio of light transmitted through the material to the incident light. The body material may also have a haze of less than 50%, including all values therein. Haze may be understood as the amount of light scattered from within or from the surface of a specimen. Accordingly, the luminescent core may be at least partially visible through the body material.

The body material and/or exposed (second) material may also include a texture, which may be understood herein as regular or irregular features, such as protrusions or depressions, located on the surface or near surface of the body. The texture may be incorporated on only a portion of the chew or may be incorporated over the entire chew surface. Furthermore, the texture may vary across the surface of the chew. It should be understood that the haze and transmittance of the body materials may be altered by the texture on the surface.

The body material and/or the exposed (second) material may also incorporate an attractant. The attractant may be present at a level of between about 0.1% to 10% by weight of the polymeric material, including all ranges and increments therein. The attractant may be an olfactory stimulant or a flavoring. Exemplary attractants may include the meal or by-products of fish, meat, poultry, etc. In addition, the attractants may include animal digests. By animal digest it is meant to include a substance made by taking relatively clean and relatively undecomposed animal tissue and breaking it down utilizing chemical or enzymatic hydrolysis. The animal digest may include hydrolyzed liver, e.g., hydrolyzed poultry liver. In addition, the animal digests may not contain hair, horn, teeth, hooves or feathers, which may be present in unavoidable trace amounts. The animal digests may be obtained, for example, from Applied Food Biotechnology Incorporated, O'Fallon, Mo., and sold under the trade name Optimizor®. The attractants may be provided in a number of forms such as liquid or powder. It may also be provided as a concentrate.

A coating may also be formed on the body to provide various visual effects or to provide the attractant. The coating may include a polymeric material which may be over molded, dip coated, etc. onto the chew. The coating may include for example, various pigments, such as pearlescent or metallic pigments to better mimic the desired body configuration. However, it should be appreciated that, like the body, the coating may be transparent.

An exemplary method of forming the animal chew may include molding the body and end portions of the chew, including one or more blind holes formed in the body portion. The body and ends may be molded by any number of melt conversion processes. It should be appreciated that melt conversion processes may include injection molding, extrusion, compression molding, blow molding, transfer molding, etc. The exposed regions (second material) may then be molded into the blind holes formed in the body portion. Various over-molding techniques may be used to form the exposed regions. For example, the exposed regions may be formed by injection molding the second material into the blind holes of the body portion in a second, subsequent step.

FIG. 3 describes an exemplary embodiment of a method for forming the chew toys described herein. The body portion and end portions (if present) of the chew may be formed by providing a first material 100 that may have a first property, such as hardness, composition or luminescence. Once provided, the first material may be formed into a first configuration 200 by injection molding, for example, wherein the first material may be melted and forced into a mold cavity. As part of the molding process of the first material, one or more blind holes may be formed into the body portion of the chew toy. The first material may be allowed to cool 300 to at least a partially solidified state, wherein the modulus of the first material is sufficient for the material to support itself upon removal from the mold cavity. For example, an approximation of such temperature is when the center of the core material may be cooled to +/−15° C. of the heat distortion temperature or Vicat softening temperature of the material, including all ranges and increments therebetween.

The heat distortion temperature may be understood as the temperature in which a specimen subject to three-point bending deflects a fixed distance under a specified load. An exemplary testing method for determining the heat distortion temperature may include ASTM standard D648. The Vicat softening temperature may be understood as the temperature at which a lightly loaded flat pin penetrates a fixed distance into a test specimen. An exemplary testing method for determining the Vicat softening temperature may include ASTM standard D1525. Both of these points provide an indication of the intrinsic resistance of a thermoplastic material to distortion or warpage at elevated temperatures.

As part of the process of molding the first material (100-300), blind holes 60 may be formed into the outer surface of the first (body) material. This may be accomplished by including projections or loose pieces in the cavity of the forming mold which may form the blind holes part-way through the body portion. The projections in the mold or loose pieces may be removed after the cooling of the first material 300 leaving blind holes which may be filled with a second material (400-600 in FIG. 3). Optionally, the first material may be molded using one or more high melt point or soluble materials as projections in the mold to form the blind holes wherein after the first material has cooled 300, the molded-in-place projections may be melted or dissolved to leave a blind hole. Further, such blind holes may be formed after the first material has been cooled 300 by drilling such holes into the surface of the first material.

The body portion (first material at 300) may be transferred or otherwise located into a second mold cavity that provides a second configuration for the exposed regions of the chew. It should be appreciated that the second mold cavity and the first mold cavity may be two different cavities or may be the same cavity wherein the first cavity is configurable through the activation of moving cores. The first mold cavity may also form a portion of the second mold cavity or vice versa. Optionally, the core portion may be treated, such as with an adhesive or other bonding treatment, before or after transferring or otherwise locating the body portion into a second mold cavity.

A second material 400 for forming the exposed regions by filling the blind holes and having a second hardness or relative transparency may then be provided. The second material may be melted and formed into the blind holes 500 to form exposed regions. As alluded to above, the melt temperature of the second material may be within about +/−10° C. of the melting or flow temperature of the first material for the purpose of providing melt bonding, particularly if the blind holes are not undercut or die-locked. The second material may then be allowed to cool 600 to the point where it has sufficient modulus to support itself when removed from the mold. If the blind holes contain a die-locked condition, such difference in melt temperatures of the first and second materials may not be necessary to ensure retention of the second material in the blind holes of the first material.

It should also be appreciated that in another exemplary embodiment, the exposed regions (second material) may be molded first into shapes that complement the die-locked blind holes (as protrusions) and exposed regions and that molding placed into the cavity portion of a second mold that may form the body portion. These exposed regions may include a cylindrical or conical protrusion that is the counterpart to the blind boles in the first method (FIG. 3) embodiment. The body (first material) may then be molded around the regions of the second material and may capture the second material into the body portion.

FIG. 4 illustrates this exemplary embodiment of that method for forming the chew toys. The exposed regions of the chew may be formed by providing a second material that may have a second hardness or composition or may be relatively clear 100'. Once provided, the second material may be formed into shapes representing the exposed regions 200' by injection molding, for example, wherein the second material may be melted and forced into a mold cavity.

A mold cavity may be provided for forming the body portion of the chew on to the exposed region portion and include one or more positioning features that may locate the exposed region portion formed at 200' described above (second material formed into shapes that complement the die-locked blind holes and exposed regions) into the mold cavity to form a portion of the mold cavity surface 300'. Mold segments may be understood as a feature, or set of matching features, which may form surfaces or locate inserts in a mold cavity, such as inner or exterior surfaces and may be positioned within the cavity parallel to, perpendicular to or at various angles to the direction of injection of the polymer material. The extension and retraction of the mold segments may be facilitated by the use of hydraulically, pneumatically or electrically activated plates, cams, actuators, etc.

In such a manner, once molded, the exposed regions may form a surface against which the body portion may be formed. In one example, in forming the exposed regions 50 of FIG. 1, the exposed regions (second material) may be formed separately into a shape including one or more protrusion that project from the inside surface of the molding.

The second material may be allowed to cool to at least a partially solidified state, wherein the modulus of the second material is sufficient for the material to support itself under the injection force of the first material. Injection force of the first material may be dependent upon the viscosity of the first material at a given temperature, part geometry, and tool geometry. The exposed regions may then be placed in the mold 300' for the body portion to attach the exposed regions to the first material which may provide outer surfaces different in some property from the first material.

A first material forming the body portion may then be provided 400' and injected around (or through) the exposed regions positioned in the cavity of the chew mold for the body portion and form the animal chew including the equivalent of blind holes filled by a second material different from the first material of the body portion.

The first material may be melted and formed into a body configuration 500' which includes the exposed regions 50 as part of the outer surface of the body. The first material may then be allowed to cool to a point where it has sufficient modulus to support itself when removed from the mold.

It is further contemplated that the exposed regions comprising the second material may be in the form of one or more moldings which are not hollow and do not fully cover the circumference of the body portion. That, is the exposed regions may fill one or more blind holes but not be contiguous or interconnected.

It should also be appreciated that more than just a first material and a second material may be contemplated by the present invention. For example, three or more materials may be included to form various configurations of the animal chew. In one embodiment, the animal chew may include a first body material, a second material for a first exposed region, a third material for a second exposed region, and a fourth material for a third exposed region, and so forth, wherein the first material may provide one property and the second, third and fourth materials provide a second property.

The foregoing description is provided to illustrate and explain the present invention. However, the description hereinabove should not be considered to limit the scope of the invention set forth in the claims appended here to.

What is claimed is:

1. An animal chew, comprising:
    a first shape of a first material, the first shape comprising a first end portion, a second end portion, and a body portion between the first and second end portions, wherein:
        the first shape includes a die-locked recess between said first and second end portions, the die-locked recess including a first sidewall at least partially defined by the first end portion, a second sidewall at least partially defined by the second end portion, and a bottom surface at least partially defined by a surface of said body portion;

said first shape further comprises a plurality of blind holes between said first and second sidewalls, each of said plurality of blind holes extending from said bottom surface of said die-locked recess and partially through a thickness of said body portion; and a second material on the first shape, wherein:

the second material is within said die-locked recess of said first shape;

at least a portion of the second material is within said plurality of blind holes;

at least a portion of the second material remains exposed; and the second material does not extend over said first and second end portions.

2. The animal chew of claim 1 wherein said second material forms a hollow shape that at least partially surrounds a part of said body portion.

3. The animal chew of claim 2 wherein one or more of said body portion, said first and second end portions, and an exposed region of said second material includes one or more protrusions.

4. The animal chew of claim 2 wherein at least a portion of said second material comprises one or more protrusions.

5. The animal chew of claim 2 wherein said first material comprises a polyamide and said second material comprises a polyurethane.

6. The animal chew of claim 1 wherein at least one of said plurality of blind holes has a tapering cross-section.

7. The animal chew of claim 1 wherein said first material comprises a polyamide and said second material comprises a polyurethane.

8. The animal chew of claim 1 wherein the first material is an edible composition, the second material is an edible composition, or both the first and the second material are an edible composition.

9. The animal chew of claim 8 wherein said first material comprises a starch composition and said second material comprises a beef composition.

10. The animal chew of claim 1 wherein at least one of said first material and said second material is transparent, translucent, fluorescent, luminescent or phosphorescent.

11. The animal chew of claim 1, wherein the first material and second material are different from one another.

* * * * *